United States Patent
Udava et al.

(10) Patent No.: US 10,489,188 B2
(45) Date of Patent: Nov. 26, 2019

(54) METHOD FOR REDUCING INTERRUPT LATENCY IN EMBEDDED SYSTEMS

(71) Applicant: Samsung Electronics Co., Ltd., Suwon-si, Gyeonggi-do (KR)

(72) Inventors: Raju Siddappa Udava, Bangalore (IN); Balaji Somu Kandaswamy, Bangalore (IN); Patana Bhagwan Reddy, Bangalore (IN); Tushar Vrind, Bangalore (IN); Venkata Raju Indukuri, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 6 days.

(21) Appl. No.: 15/825,472

(22) Filed: Nov. 29, 2017

(65) Prior Publication Data

US 2018/0203722 A1    Jul. 19, 2018

(30) Foreign Application Priority Data

Jan. 19, 2017    (IN) .............................. 201741002175

(51) Int. Cl.
     *G06F 9/46*      (2006.01)
     *G06F 9/48*      (2006.01)

(52) U.S. Cl.
     CPC .............. *G06F 9/463* (2013.01); *G06F 9/462* (2013.01); *G06F 9/4812* (2013.01); *G06F 9/4843* (2013.01); *G06F 9/461* (2013.01)

(58) Field of Classification Search
     CPC ............................... G06F 9/461; G06F 9/4812
     See application file for complete search history.

(56) References Cited

U.S. PATENT DOCUMENTS

| | | | |
|---|---|---|---|
| 5,161,226 A * | 11/1992 | Wainer | G06F 9/463 710/264 |
| 5,727,211 A | 3/1998 | Gulsen | |
| 7,313,797 B2 | 12/2007 | Sundaram et al. | |
| 7,676,604 B2 | 3/2010 | Halleck et al. | |
| 2015/0033227 A1* | 1/2015 | Lin | G06F 21/55 718/1 |

* cited by examiner

*Primary Examiner* — Zachary K Huson
(74) *Attorney, Agent, or Firm* — Harness, Dickey & Pierce, P.L.C.

(57) ABSTRACT

The various embodiments of the present invention disclose a method for reducing interrupt latency in embedded systems. According to at least one example embodiment of the inventive concepts, the method for reducing interrupt latency in embedded systems, the method comprises steps of toggling, by a processor, from a supervisor (SVC) mode to an interrupt request (IRQ) mode on receiving an interrupt, identifying, by the processor, a Task Control Block (TCB) of a preempted task on receiving the interrupt, enabling, by the processor, the IRQ stack as a pseudo preempted task context table, and storing the preempted task context information in the IRQ stack, wherein a register set is stored in IRQ stack before processing the received interrupt.

18 Claims, 4 Drawing Sheets

METHOD FOR REDUCING INTERRUPT LATENCY IN EMBEDDED SYSTEMS

PRIORITY

This application claims priority under 35 U.S.C. § 119(a) to Indian Complete Patent Application Serial No. 201741002175 (CS), which was filed on Jan. 19, 2017 in the Indian Intellectual Property Office, the entire disclosure of which is incorporated herein by reference.

BACKGROUND

1. Field

At least some example embodiments of the inventive concepts generally relate to computer architecture and more particularly to a method for reducing interrupt latency in embedded systems.

2. Related Art

In systems programming, handling of interrupts is one issue that can affect performance and efficiency of process handling. An interrupt is a signal to a processor or a controller of an embedded system that can be emitted either by hardware or software indicating an event that needs immediate attention. The real time devices in which interrupt technique is used are called as interrupt-driven devices. An interrupt can be either a hardware interrupt or a software interrupt, wherein the software interrupts can be of the type exceptions and instruction set.

Interrupt latency plays a very crucial factor in all real-time embedded systems, as the embedded systems need to execute multiple tasks of the user efficiently without delay. Interrupt latency is an amount of time that elapses from the time the interrupt is received by the processor until the time the interrupt processing begins. Interrupt latency primarily refers to the software interrupt handling latencies. One aspect of kernel real-time performance is the ability to service an interrupt request (IRQ) within a specified amount of time.

With advent of multicore and multiprocessor systems, the role of interrupts and associated latency may increase as more than 10,000+ interrupts are processed every second on some current real time embedded systems. With the growing trend, a number of interrupts in a system may increase to aid in multi-core scheduling and communications.

In a preemptive scheduling based real time operating system (RTOS), an interrupted task need not be the one which gets scheduled after interrupt service routine (ISR) is complete. The ISR can activate another higher priority task and post-interrupt scheduling will give control to high priority task. Therefore, it becomes important and mandatory to store current task context of interrupted task so that once the higher priority task execution is complete, the interrupted task can be fetched back and resumed to complete the process. Interrupted Task Context (ITC) contains all necessary information to resume the interrupted task activities again. Currently, for advanced RISC machine (ARM) based system, complete task register bank, R0-R12, Stack Pointer (SP), Link Register (LR), Program Counter (PC), Current Program Status Register (CPSR), is required to be saved for execution of the interrupted task. The set of these registers: R0-R12, SP, LR, PC and CPSR will be referred to as "Complete Register Set".

Based on general OS literature, it is observed that the ITC is usually stored in corresponding task stack. Alternatively, ITC can also be stored in either Task Manage Unit/Task Control Block or Global preempted task context table.

In current methodologies to store the ITC, it is required to temporarily store required registers in interrupt request (IRQ) stack, change to supervisor (SVC/user) mode in which task was running, and store complete task context in the Task stack. Some registers which were earlier temporarily pushed in the IRQ stack are needed to be popped out now and pushed into the task stack. The presence of INTERMEDIATE push & pop in IRQ stack add up to overall interrupt latency. In example cases that we have seen, intermediate register store can be upto 6 registers.

Consider a use case, wherein a processor is executing a process and receives an interrupt. Upon receiving the interrupt, the processor toggles to interrupt request (IRQ) mode from supervisor (SVC) mode. The IRQ mode and SVC mode both share common register bank R0-R12. Therefore, before IRQ mode initial operations are carried out, a few registers are stored temporarily in the IRQ stack. IRQ mode initial operations mainly comprises of identification of preempted tasks TCB. Then mode is switched back to SVC mode, and a complete task context is stored after pulling temporarily stored registers from the IRQ stack and pushed into the preempted task stack.

The pulling and pushing of the complete context require more time and bandwidth of the processor, and thus will affect the performance of the system.

At least some example embodiments of the inventive concepts may address the above mentioned shortcomings, disadvantages and problems.

SUMMARY

According to at least some example embodiments of the inventive concepts, a method for reducing interrupt latency in embedded systems includes toggling, by a processor, from a supervisor (SVC) mode to an interrupt request (IRQ) mode upon receiving an interrupt; identifying, by the processor, a task control block (TCB) of a preempted task upon receiving the interrupt; enabling, by the processor, an IRQ stack as a pseudo preempted task context table; and storing preempted task context information in the IRQ stack, wherein a register set is stored in the IRQ stack before processing the received interrupt thereby enabling reduced interrupt latency. RTOS scheduler would be required to identify interrupted task and store interrupted task context (register set)—followed by Interrupt Service Routine (ISR) execution. By storing interrupt task context as 'first activity' before anything else (identification of interrupt source or identification of preempted task), the banked registers are free to be used for other RTOS Scheduler or Interrupt handler activities without carrying out any temporary store. Here, it is understood that RTOS scheduler would be involved in context store and context restore activities along with general scheduling decisions.

According to at least some example embodiments of the inventive concepts, an embedded device for reducing interrupt latency includes a processor adapted for toggling from a supervisor (SVC) mode to an interrupt request (IRQ) mode on receiving an interrupt; and enabling an IRQ stack as a pseudo preempted task context table; an RTOS scheduler adapted for identifying a Task Control Block (TCB) of a preempted task on receiving the interrupt; a memory unit adapted for storing the preempted interrupted task context information in the IRQ stack, wherein a register set is stored in the IRQ stack before processing the received interrupt thereby enabling a reduced interrupt latency; and an interrupt handler adapted for handling a process under execution on receiving the interrupt from one or more peripheral devices.

According to at least some example embodiments of the inventive concepts, a method of operating an embedded system includes changing, by a processor of an embedded system, a mode of the embedded system from a supervisor (SVC) mode to an interrupt request (IRQ) mode in response to receiving an interrupt at the processor; executing, by the processor, instructions included in a RTOS scheduler routine for identifying a task control block (TCB) of a preempted task based on receiving the interrupt; enabling, by the processor, an IRQ stack as a pseudo preempted task context table; storing preempted task context information in the IRQ stack; and storing a register set in the IRQ stack before processing the received interrupt.

BRIEF DESCRIPTION OF THE ACCOMPANYING DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
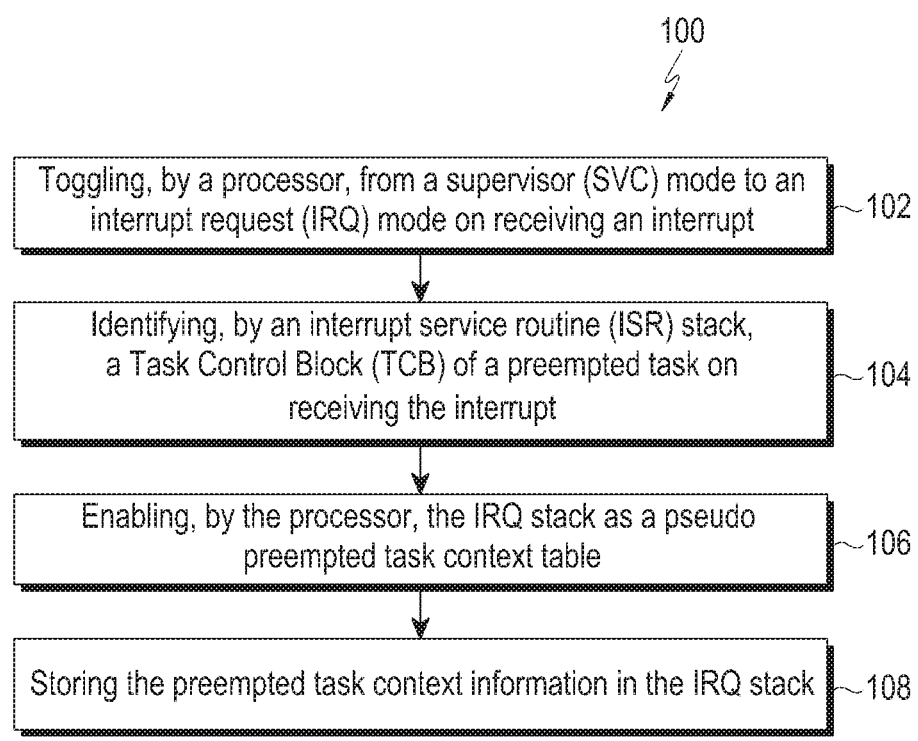
FIG. 1 is schematic flow diagram illustrating a method for reducing interrupt latency in embedded systems, according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

According to at least one example embodiment of the inventive concepts, a method for reducing interrupt latency in embedded systems is described herein. According to at least one example embodiment of the inventive concepts, the method includes a processor (e.g., a processor of a user equipment (UE)) toggling from a supervisor (SVC) mode to an interrupt request (IRQ) mode upon, or in response to, receiving an interrupt. Initially, user equipment (UE) will be working in supervisor mode. Upon receiving an interrupt, the processor identifies that the interrupt is received, and thus switches from supervisor mode to the IRQ mode. According to at least one example embodiment of the inventive concepts, the processor of the UE can receive an interrupt from at least one of sources including, but not limited to, an external entity, another processor, a direct memory access (DMA) engine, co-processors, accelerators, and the like.

Further, the method for reducing interrupt latency in embedded systems according to at least some example embodiments of the inventive concepts may include identifying, by RTOS scheduler, a Task Control Block (TCB) associated with the pre-empted task upon, or in response to, receiving the interrupt. Upon switching from SVC mode to IRQ mode, the processor begins executing tasks associated with the interrupt handling. During execution, the RTOS scheduler identifies the presence of preempted task which was halted during receiving of the interrupts. For example, according to at least some example embodiments of the inventive concepts, a processor of the embedded system may execute instructions included RTOS Scheduling for identifying the presence of preempted task which were halted during receipt of the interrupts. For example, the processor can execute instructions included in the RTOS scheduling for identifying a TCB of a preempted task based on receiving the interrupt.

Further, for reducing interrupt latency in embedded systems according to at least some example embodiments of the inventive concepts may include the processor enabling the IRQ stack as a pseudo preempted task context table. Upon identifying the presence of the preempted tasks, the processor enables ISR stack as the pseudo preempted task context table.

Further, the method for reducing interrupt latency in embedded systems according to at least some example embodiments of the inventive concepts may include storing the preempted interrupted task context information in the IRQ stack. Upon enabling the ISR stack, the processor stores the preempted interrupt task context information in the IRQ stack, wherein a register set is stored in the IRQ stack as a first activity before processing the received interrupt thereby avoiding temporary register store in IRQ stack and enabling reduced interrupt latency. The set of registers: R0-R12, Stack Pointer (SP), Link Register (LR), Program Counter (PC) and Current Program Status Register (CPSR) will be referred to as "Register Set". the register set stored in the IRQ stack is a complete register set or a incomplete register set. A complete register set includes all of these resisters, and a incomplete register set includes a part of these resisters.

According to at least one example embodiment of the inventive concepts, a configuration of the register set to be stored is one of static or dynamic mode; static mode indicates a number of registers to be pushed is fixed, and the dynamic mode indicates the number of registers to be pushed is configurable. According to at least one example embodiment of the inventive concepts, a stack pointer of the preempted task is made to point to the stored task context information in the IRQ stack. For example the method for reducing interrupt latency in embedded systems according to at least some example embodiments of the inventive concepts may include setting a stack pointer of the preempted task to point to the stored preempted task context information in the IRQ stack.

According to at least another example embodiment of the inventive concepts, the method for reducing interrupt latency in embedded systems according to at least some example embodiments of the inventive concepts may include resetting the IRQ stack during at least one of events including, but not limited to, the real time operating system (RTOS) entering an IDLE mode, a context counter being set to Zero, and the like, wherein the context counter is incremented with every context store operation and decremented for every context restore operation on the IRQ stack. For example, the method for reducing interrupt latency in embedded systems according to at least some example embodiments of the inventive concepts may include resetting the IRQ stack based on an occurrence of at least one of a real time operating system (RTOS) entering an IDLE mode; and a context counter being set to zero.

According to at least one example embodiment of the inventive concepts, a stack size of the IRQ stack may be defined or, alternatively, predefined when the IRQ stack is used as the pseudo preempted task context table, wherein the stack size of the IRQ stack is determined based on a number of unique priority tasks and a task context size.

According to at least another example embodiment of the inventive concepts, the complete IRQ stack when used as the pseudo preempted task context table is stored in fast access memory banks to speed up the store and restore operations.

According to at least another example embodiment of the inventive concepts, the method for reducing interrupt latency in embedded systems according to at least some example embodiments of the inventive concepts may include supporting interrupt nesting (i.e., nested interrupts or interrupts of interrupts) when using the IRQ stack as the pseudo preempted task context table, where a nested interrupt context is also stored in IRQ stack along with the preempted task contexts and a nesting indicator global variable is set to identify interrupt nesting levels. The nested interrupt context stored in the IRQ stack can be a complete nested interrupt context.

FIG. 1 is a schematic flow diagram 100 illustrating a method for reducing interrupt latency in embedded systems, according to at least one example embodiment of the inventive concepts. According to the schematic flow diagram 100, at step 102, the processor toggles from a supervisor (SVC) mode to an interrupt request (IRQ) mode upon, or in response to, receiving an interrupt. Further, at step 104, an RTOS Scheduler identifies a Task Control Block associated with a pre-empted task once the interrupt is received. Further, at step 106, the processor enables the IRQ stack as a pseudo preempted task context table. Further, at step 108, the processor stores the preempted interrupted task context information in the IRQ stack. The activities listed 102–108 compose altogether as a part of RTOS scheduling, and it includes identification of received interrupt source, identification of preempted task and storing of preempted task context.

According to at least some example embodiments of the inventive concepts, upon receiving interrupt, the processor switches from SVC mode to IRQ mode. In the processor, both SVC mode and the IRQ mode share the same registers R0-R12 for storing context associated with tasks. Before executing tasks associated with IRQ mode (RTOS scheduling), store some registers temporarily in the IRQ stack. The processor then toggles to SVC mode to store preempted task context. After switching to the SVC mode, the RTOS scheduler stores the complete context in a task control block (TCB) or a task stack, wherein the entire context stored temporarily is pulled from the IRQ stack and pushed into the TCB or a task stack. According to at least some example embodiments of the inventive concepts, a interrupted task context is stored in IRQ stack itself and TMU/TCB is updated to point to this area, wherein the IRQ stack is used as pseudo preempted task context table and the interrupted task context in IRQ stack can be a complete interrupted task context.

According to at least one example embodiment of the inventive concepts, only one task belonging to a given priority can be active at any point of time. Therefore, if a system supports N unique priorities, the maximum number or, alternatively, desired upper limit, of INTERRUPT PREEMPTED tasks in the system can be N. Further, each context store may use, for example, 68 bytes (17 registers, each 32 bit wide) of space. Thus, MAX IRQ Stack size may be, for example, N*68 bytes. According to at least one example embodiment of the inventive concepts, the IRQ stack is only used to store task context whereas the actual ISR execution happens in the Kernel stack. However, according to at least some other example embodiments, the desired upper limit of INTERRUPT PREEMPTED tasks in the system may be set to a value above or below N, for example, in accordance with the preferences of a user or designer of the system. All of these activities could be performed by a processor 202.

Figure 2:
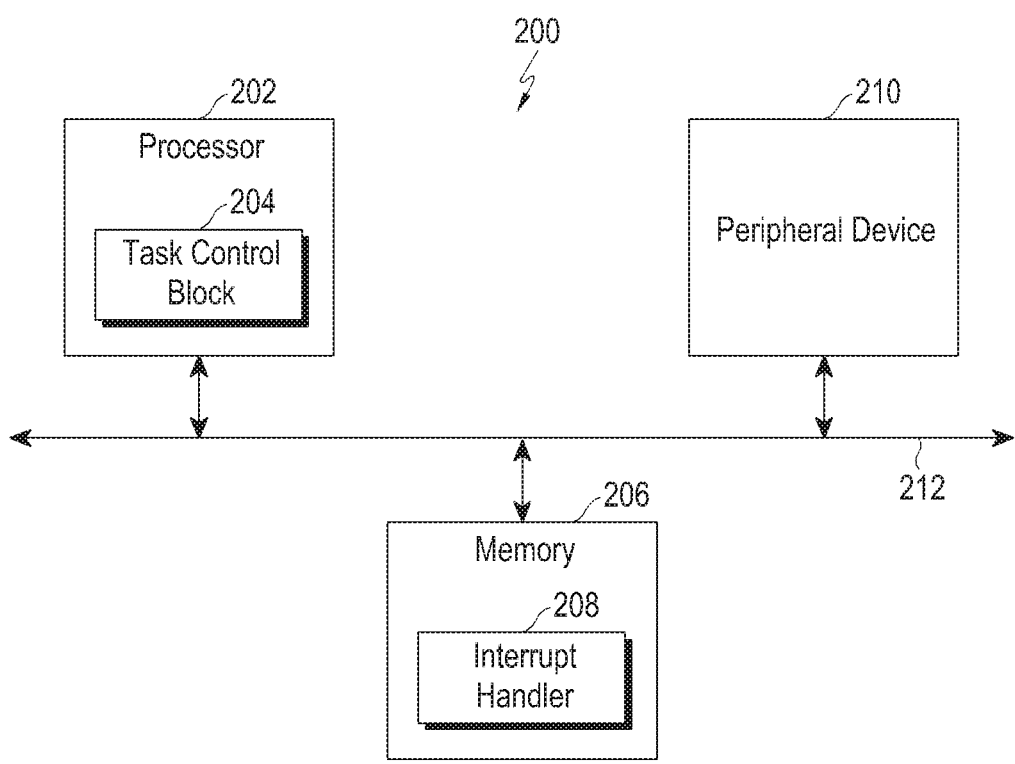
FIG. 2 is a block diagram of an embedded device according to at least some example embodiments of the inventive concepts.

FIG. 2 is a block diagram of an embedded device 200 according to at least some example embodiments of the inventive concepts. The embedded device 200 includes a processor 202, a memory 206 and a conventional peripheral device 210. The processor 202, memory 206 and the peripheral device 210 are typically interconnected by way of a bus 212. An interrupt request line, which may form part of bus 212, may be used to send an interrupt signal from peripheral device 210 to the processor 202.

The processor 202 may have an ARM-v7 based architecture. The bus 212 can be a peripheral component interconnect (PCI) bus, a PCI express (PCIe) bus, or any other suitable bus. Multiple processors and many peripheral devices may reside in the embedded device 200. The peripheral device 210 may include, for example, an application-specific integrated circuit (ASIC) with an appropriate interface for utilizing the bus 212. The embedded device 200 may also include operating system software loaded in the memory 206. The processor 202 further includes a Task Control Block (TCB) 204. The memory 206 further includes an RTOS Scheduler and interrupt service routine (ISR) or Interrupt handler 208.

According to at least some example embodiments of the inventive concepts, the processor 202 toggles from a supervisor (SVC) mode to an interrupt request (IRQ) mode upon, or in response to, receiving an interrupt, and enables an IRQ stack as a pseudo preempted task context table. Further, the processor 202 includes RTOS Scheduler adapted for identifying the Task Control Block (TCB) 204 of a preempted task upon, or in response to, receiving the interrupt.

Further, the RTOS Scheduler 208 of the embedded device 200 stores the preempted interrupted task context information in the IRQ stack memory 206, wherein a register set is stored in the IRQ stack before processing the received interrupt thereby avoiding a temporary register store and enabling a reduced interrupt latency. Interrupt thus received could be from a peripheral device 210 or from within processor 202. All of these activities could be performed by a processor 202.

Figure 3A:
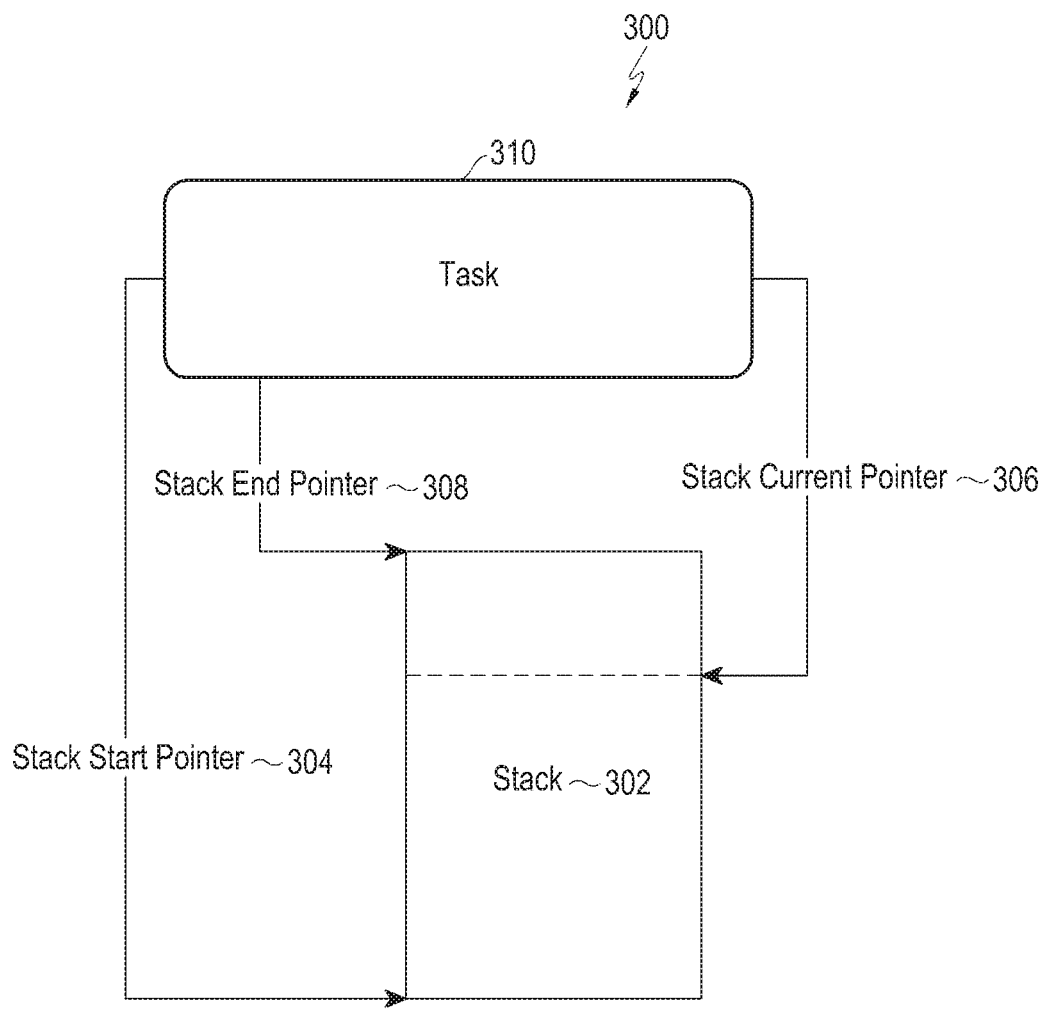
FIGS. 3A and 3B are schematic diagrams illustrating a stack structure for normal task execution versus task execution during interrupted state, according to at least one example embodiment of the inventive concepts.
Figure 3B:
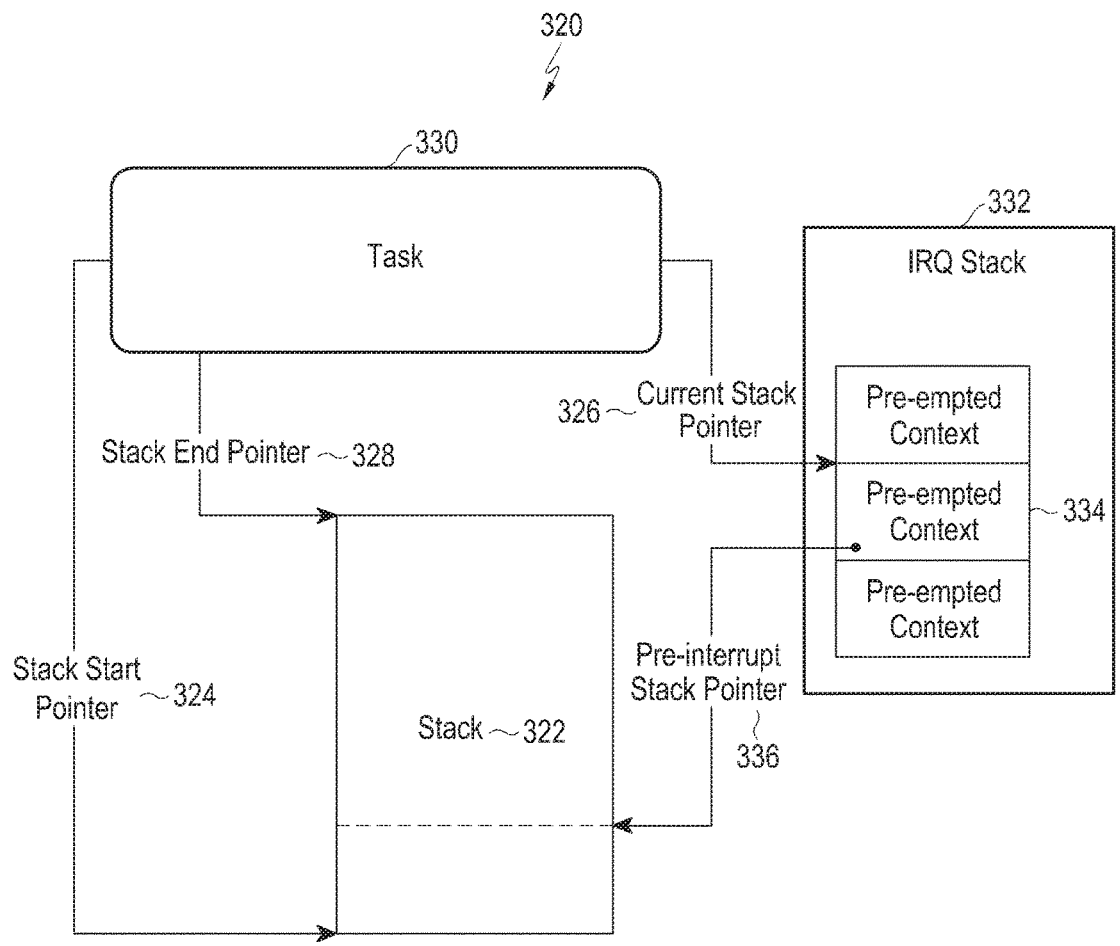

FIGS. 3A and 3B include schematic diagrams 300 and 320, respectively. Schematic diagrams 300 and 320 illustrate a stack structure for normal task execution versus task execution during an interrupted state, according to at least one example embodiment of the inventive concepts. According to at least some example embodiments of the inventive concepts, FIG. 3A illustrates structure and pointer positions in a stack during execution of normal task, while FIG. 3B illustrates structure and pointer positions in a stack during execution of task in interrupted state.

Referring to schematic diagram 300 of FIG. 3A, a general stack 302 includes a stack starting pointer 304, a current stack pointer 306, and a stack end pointer 308. As soon as this task 310 is preempted by an interrupt, a new task context is stored on the stack area 302 and the task stack pointer 306 points to the top of updated stack area 306. Thus, during normal task execution, the task current stack pointer points to the task stack 302 indicating general task is in use.

Referring to schematic diagram 320 of FIG. 3B, a general stack 322 includes a stack starting pointer 324, a current stack pointer 326, and a stack end pointer 328. During execution of any of the normal task, if a new interrupt is received by system during execution of task 330, then RTOS scheduler execution process is initiated, wherein the task is moved to a preempted state and the current stack pointer of task in a task control block (TCB) is made to point outside its stack area to an interrupt request (IRQ) stack 332 where preempted task context 334 is saved.

According to at least some example embodiments of the inventive concepts, as soon as the task 330 is interrupted, the current stack pointer 326 points to the IRQ stack 332, wherein preempted context 334 of the interrupted task is stored and in turn another pointer, pre-interrupt task stack pointer 336, points to an address location in the general stack area 322 where the interrupted task was executing. Further, the pre-interrupt stack pointer 336 is associated with the preempted context 334 of the interrupted task. As soon as the ISR executing is completed, the interrupted task along with the pre-empted context 334 is fetched from the IRQ stack 332 and task execution process is continued. The schematic diagram 320 of FIG. 3B also shows interrupted stack pointer being stored as part of context in IRQ stack, which would be referring to original preempted task stack pointer.

According to at least some example embodiments of the inventive concepts, interrupt latency may be reduced thus improving the efficiency of the UE. Further, IRQ stack for pseudo preempted task context table is small enough to be pushed into TCM, and thus execution time is faster and memory consumed is little.

Example embodiments of the inventive concepts having thus been described, it will be obvious that the same may be varied in many ways. Such variations are not to be regarded as a departure from the intended spirit and scope of example embodiments of the inventive concepts.

What is claimed is:

1. A method for reducing interrupt latency in embedded systems, the method comprising:
   toggling, by a processor, from a supervisor (SVC) mode to an interrupt request (IRQ) mode upon receiving an interrupt;
   identifying, by the processor, a task control block (TCB) of a preempted task upon receiving the interrupt;
   enabling, by the processor, an IRQ stack as a pseudo preempted task context table;
   storing preempted task context information in the IRQ stack, wherein a register set is stored in the IRQ stack before processing the received interrupt; and
   changing a stack pointer of the preempted task from pointing to a general stack to pointing to the stored preempted task context information in the IRQ stack, the general stack being a stack where the preempted task was executing prior to being preempted, the general stack being different from the IRQ stack.

2. The method of claim 1, wherein the interrupt is received from at least one of an external entity, another processor, a direct memory access (DMA) engine, one or more co-processors, or one or more accelerators.

3. The method of claim 1, wherein a configuration of the register set to be stored is one of static mode or dynamic mode.

4. The method of claim 1, further comprising:
   resetting the IRQ stack based on an occurrence of at least one of,
      a real time operating system (RTOS) entering an IDLE mode; and
      a context counter being set to zero.

5. The method of claim 4, wherein the context counter is incremented with every context store operation on the IRQ stack, and the context counter is decremented with every context restore operation on the IRQ stack.

6. The method of claim 1, wherein a stack size of the IRQ stack is defined when the IRQ stack is used as a pseudo preempted task context table, and the stack size of the IRQ stack is determined based on a number of priority tasks and a task context size.

7. The method of claim 1, where the IRQ stack when used as a pseudo preempted task context table is stored in a fast access memory bank to speed up the store and restore operations.

8. The method of claim 1, further comprising:
   supporting an interrupt nesting when using the IRQ stack as a pseudo preempted task context table, where a nested interrupt context is also stored in the IRQ stack along with preempted task contexts and a nesting indicator global variable is set to identify interrupt nesting levels.

9. The method of claim 1, further comprising:
   identifying source of the received interrupt; and
   starting an interrupt service routine.

10. An embedded device for reducing interrupts latency comprising:
    a memory; and
    a processor, coupled to the memory, configured to:
    toggle from a supervisor (SVC) mode to an interrupt request (IRQ) mode on receiving an interrupt;
    identify a task control block (TCB) of a preempted task based on receiving the interrupt;
    enable an IRQ stack as a pseudo preempted task context table; and
    store preempted task context information in the IRQ stack, wherein a register set is stored in the IRQ stack before processing the received interrupt;
    wherein the processor is further configured to change a stack pointer of the preempted task from pointing to a general stack to pointing to the stored preempted task context information in the IRQ stack, the general stack being a stack where the preempted task was executing prior to being preempted, the general stack being different from the IRQ stack.

11. The embedded device of claim 10, wherein the interrupt is received from at least one of an external entity, another processor, a direct memory access (DMA) engine, one or more co-processors, or one or more accelerators.

12. The embedded device of claim 10, wherein a configuration of the register set to be stored is one of static mode or dynamic mode.

13. The embedded device of claim 10, wherein the processor is further configured to:
  reset the IRQ stack based on an occurrence of at least one of,
    a real time operating system (RTOS) entering an IDLE mode; and
    a context counter being set to zero.

14. The embedded device of claim 13, wherein the context counter is incremented with every context store operation on the IRQ stack, and the context counter is decremented with every context restore operation on the IRQ stack.

15. The embedded device of claim 10, wherein a stack size of the IRQ stack is defined when the IRQ stack is used as a pseudo preempted task context table, and the stack size of the IRQ stack is determined based on a number of priority tasks and a task context size.

16. The embedded device of claim 10, wherein the IRQ stack when used as a pseudo preempted task context table is stored in a fast access memory bank to speed up the store and restore operations.

17. The embedded device of claim 10, wherein the processor is further configured to:
  support an interrupt nesting when using the IRQ stack as a pseudo preempted task context table, where a nested interrupt context is also stored in the IRQ stack along with preempted task contexts and a nesting indicator global variable is set to identify interrupt nesting levels.

18. The method of claim 1, wherein the processor is further configured to:
  identify source of the received interrupt; and
  start a interrupt service routine.

* * * * *